United States Patent [19]

Taylor

[11] Patent Number: 4,975,185
[45] Date of Patent: Dec. 4, 1990

[54] PORTABLE WATER PURIFICATION SYSTEM

[75] Inventor: John A. Taylor, Pinckney, Mich.

[73] Assignee: Separation Dynamics, Inc., Southfield, Mich.

[21] Appl. No.: 348,893

[22] Filed: May 8, 1989

[51] Int. Cl.$^5$ .............................................. B01D 61/10
[52] U.S. Cl. .............................. 210/136; 210/321.89; 210/416.3; 210/500.23
[58] Field of Search .................. 210/136, 416.3, 321.8, 210/321.89, 446, 445, 500.23

[56] References Cited

U.S. PATENT DOCUMENTS 2,649,205  8/1953  Quinn ................................ 210/416.3
4,547,289  10/1985  Okano et al. ............... 210/321.89 X

*Primary Examiner*—Frank Spear
*Attorney, Agent, or Firm*—Kenneth I. Kohn

[57] ABSTRACT

A portable water purification system (10) includes a portable reservoir (12) for containing a contaminated water supply (14) and a separator module (48) for separating water and water soluble substance permeate from a contaminated water retentate. A permeate outlet (52) is operatively connected to the separator module (48) for releasing water and water soluble substances from the system (10). A return conduit (34) is operatively connected between the separator module (48) and the reservoir (12) for returning contaminated water retentate back to the reservoir (12). A plunger (54) is operatively connected to the reservoir (12) and includes an inlet chamber (32). The plunger draws contaminated water from the reservoir (12) and forces the contaminated water (32) through the separator module (48) so that the permeate flows out the permeate outlet (52) and the retentate flows out the return conduit (36).

9 Claims, 1 Drawing Sheet

PORTABLE WATER PURIFICATION SYSTEM

TECHNICAL FIELD

The present invention relates to an apparatus for the reclamation of water from contaminated water. More specifically, the present invention relates to a portable device for removing contaminating substances from contaminated water.

BACKGROUND ART

A need frequently arises for a supply of pure drinking water when regular supplies of potable water are unavailable. For example, campers, hunters, operators of recreational vehicles, pleasure boaters, and military personnel often require pure drinking water when none is readily available. However, water contaminated with microbes, hydrocarbons, or other contaminants may be available. In addition to situations arising in remote areas, pure water is often in scarce supply in certain countries of the world.

U.S. Pat. No. 4,857,081, issued Aug. 15, 1989, to applicant and assigned to the assignee of the present invention provides a process for separating hydrocarbons and halogenated hydrocarbons from water contaminated therewith. The process utilizes hollow fibers made from regenerated cuproammonium or viscose cellulose. The process provides a means for drying hydrocarbons and halogenated hydrocarbons as well as providing a water permeate free of hydrocarbons and halogenated hydrocarbons.

The present invention provides a portable device for in-situ purification of suspect water wherein microbial agents such as viruses, bacteria, molds, algae and other microorganisms such as parasites may be effectively removed from available water supplies. The invention further provides a portable device for the removal of oily contamination from suspect water simultaneously with the removal of the microorganisms. Further, the invention provides a portable apparatus than can purify water without the use of electricity or additional paraphernalia.

SUMMARY OF THE INVENTION

In accordance with the present invention, there is provided a portable water purification system including portable water reservoir means for containing a contaminated water supply and separator means for separating a water and water soluble substance permeate from a contaminated water retentate. A permeate outlet is operatively connected to the separator means for releasing water and water soluble substances from this system and a return conduit is operatively connected between the separator means and the reservoir for returning contaminated water retentate back to the reservoir. The invention is characterized by including plunger means operatively connected to the reservoir means and including an inlet chamber for drawing contaminated water therefrom. The plunger means contains the separator means therein for forcing the contaminated water in the inlet chamber through the separator means so that the permeate flows out the permeate outlet and the retentate flows to the return conduit.

FIGURES IN THE DRAWINGS

Other advantages of the present invention will be readily appreciated as the same becomes better understood by reference to the following detailed description when considered in connection with the accompanying drawings wherein:

FIG. 1 is an elevational view partially in cross section of a portable purification system made in accordance with the present invention; and FIG. 2 is an enlarged cross sectional view of a hollow fiber membrane which forms part of the separation means of the present invention.

DETAILED DESCRIPTION OF THE INVENTION

Figure 1:
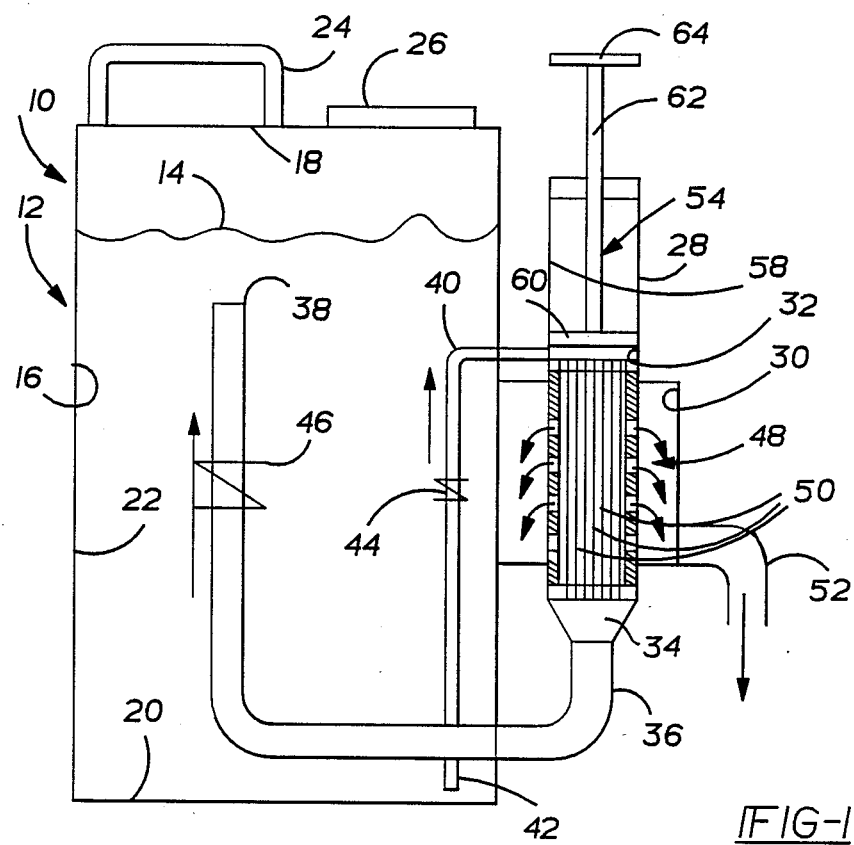

A portable water purification system constructed in accordance with the present invention is generally shown at 10 in the Figure. The system 10 includes a portable reservoir 12 for containing a contaminated water supply 14 therein. The reservoir 12 is in the form of a container 12 having an inner fluid chamber 16. The chamber 16 includes a top surface 18 a bottom surface 20 and a side wall 22 extending therebetween. A handle 24 is connected to the container 12 to provide an easy means for carrying the system 10. The container 12 could have varying volume capacities, for example 1, 3, 5 or 10 gallon capacities. The container 12 includes a fill port 26 for allowing filling of the reservoir 12 with the contaminated water 14.

A barrel 28 is operatively connected to the reservoir 12. The barrel 28 includes a separator chamber 30 and an inlet chamber 32. The inlet chamber 32 is disposed adjacent to the separator chamber 30 and is in fluid communication therewith. The barrel 28 includes a tapered constriction providing a return outlet 34 at the bottom thereof. An outlet conduit 36 is in fluid communication with the return outlet 34 and includes an end portion 38 within the inner chamber 16 of the container 12. An inlet conduit 40 is in fluid communication with the inlet chamber 32 and includes an end portion 42 disposed within the fluid chamber 16.

The inlet conduit 40 includes a first one way valve 44 allowing one way directional flow of fluid from the inner fluid chamber 16 to the inlet chamber 32. The outlet conduit 36 includes a second one way valve 46 which allows one way fluid flow from the return outlet 34 to the inner chamber 16 of the reservoir 12.

The system 10 includes separator means for separating a water and water soluble substance permeate from a contaminated water retentate. More specifically, the separator means comprises a cartridge generally indicated at 48 including a plurality of hollow fiber membranes consisting of polyglucose fibers, such as regenerated cuproammonium or viscose cellulose fibers. Such fibers for the use of separating hydrocarbons and halogenated hydrocarbons from a water permeate are discussed in detail in the U.S. patent application Ser. No. 194,984 to applicant. These preferred membranes are composed of regenerated cellulose such as made from the viscose or cuproammonium process. Regenerated hollow fibers are convenient for employment as the membrane in the water purification module, but spiral wound sheets or tubes of viscose or cuproammonium regenerated cellulose may also be used. Such membranes have the ability of separating water from such microbial agents as viruses, bacteria, molds, algae, and other microorganisms such as parasites. The membranes are also capable of removing oily contamination from suspect water simultaneously with the removal of the microorganisms. The membranes are nonporous in nature and capable of permeation of water while being nonpermeable to water insoluble products including the above mentioned microbes. The membranes do not degrade when placed in contact with contaminates such as hydrocarbons and halogenated hydrocarbons.

Figure 2:
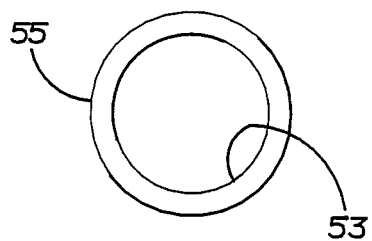

Each fiber includes an inner core 53 and outer surface 55, as shown in FIG. 2. As shown in FIG. 1, the inner cores 53 are in fluid communication with the inlet chamber 32 and outlet 34. The outer surfaces 55 are in fluid communication with the separation chamber 30 and permeate outlet 52. The permeate outlet is operatively connected to the separator module 48 for releasing water and water soluble substances from the system 10.

The invention includes plunger means operatively connected to the reservoir 12 for drawing contaminated water from the reservoir 12 and forcing the contaminated water through the separator module 48 so that the permeate flows out the permeate outlet 52 and the retentate flows to the return conduit 36. More specifically, the plunger means includes the inlet chamber 32 and a plunger generally indicated at 54 which is axially slideably disposed therein. The inlet chamber 32 includes a wall 58 disposed thereabout. The plunger means 54 includes a piston 60 disposed within the inlet chamber 32 and in sealing engagement with the wall 58 disposed thereabout. The piston 60 is capable of axial reciprocating movement relative to the wall 58. A rod 62 is connected to the piston 60 and extends axially therefrom. The rod 62 is exposed outside of the barrel 28. A handle member 64 is connected to the end of the rod 62 exposed outside of the barrel 28. The plunger 54 provides a pumping mechanism for drawing contaminated water from the reservoir 12 and into the inlet chamber 32 and then forcing the contaminated water from the inlet chamber 32 through the separator module 48.

As shown in FIG. 1 and described above, the hollow cores 53 of the fibers 50 are in direct fluid communication with the inlet chamber 32. Alternatively, the inlet chamber 32 could be in fluid communication with the outer surfaces of the fibers 50 such that the permeate flows to the hollow cores of the fibers which would be in fluid communication with the separator chamber 30 and permeate outlet 52.

In operation, a barrel 28 including a separation module 48 disposed therein is fitted to a reservoir container 12 for holding water to be purified. Contaminated water is filled into the container 12 through the fill port 26. The plunger 54 is moved upwardly so as to draw contaminated water into the inlet chamber 32. Plunger 54 is forced downwardly to force the contaminated water into the separation module forcing a water permeate through the hollow fibers 50 and out the permeate outlet 52. Contaminated water retentate remains within the cores of the hollow fibers 50 and is forced out the outlet 34 into the outlet conduit 36 and eventually into the container 12. The end portion 38 of the conduit 36 is spaced from the end portion 42 of the conduit 40 to allow for mixing of the retentate exiting the end portion 48 of outlet conduit 36 with the water contained within the container 12 prior to being drawing into the end portion 42 of the inlet conduit 44. As shown in FIG. 1, the end portion 42 of inlet conduit 40 is adjacent the bottom surface 20 of the container 12 and the end portion 38 of outlet conduit 36 is disposed more proximate to the upper surface 18. This allows for mixing of the contaminated water retentate leaving the outlet 38 with the contaminated water held within the container 12 prior to its being drawn into the end portion 42 of the inlet conduit 40. One way valves 44,46 prevent the plunger 54 from either forcing contaminated water in the inlet chamber 32 back through the inlet conduit 40 or drawing contaminated water into the outlet conduit 36.

EXAMPLES

Example 1:

A hollow fiber separation module was constructed by encapsulating the ends of a bundle of cuproammonium regenerated cellulose hollow fibers in polyurethane. The polyurethane potting material was cut through exposing open hollow fibers. The bundle of hollow fibers was affixed in a tubular shaped housing made of polycarbonate material. The working surface area of the hollow fiber membrane water purification module was 0.2 $m^2$. The hollow fiber membrane device was fitted with a hand pump and the whole assembly connected to a reservoir. The pump was used to draw contaminated water from the reservoir and pass the water through the bores of the aforementioned hollow fiber water purification module. Water containing 0.5% tetrachloroethylene and 0.5% diesel fuel was placed in the reservoir for purification. Water permeating the hollow fiber membrane module was collected and analyzed by gas chromatography for the presence of hydrocarbons and halogenated hydrocarbons.

Results:

Gas chromatographic analysis of water permeate from the hollow fiber module determined that the water contained no detectable hydrocarbons or halogenated hydrocarbons. Detection limits of the analytical method = 0.05 mg/l.

Example 2:

The device described in Example 1 was filled with stagnant water from a stream. The stagnant water contained an obvious green color which microscopic examination determined to be algae and other microorganisms. The stagnant algae contaminated water was pumped through the membrane device described as part of the system in Example 1 and samples collected for microscopic analysis. Water samples collected after passing through the membrane device appeared glass clear and bright. No evidence of algae or other microorganisms was apparent in the purified water after having passed through the membrane. The purified water samples were then incubated at 37° C. for 7 days. No algae occurred after 7 days incubation and the samples remained glass clear and bright. Microscopic examination of the incubated water samples after 7 days showed that no apparent microbiological growth had occurred.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A portable water purification system (10) comprising portable reservoir means (12) for containing a contaminated water supply (14); separation means (48) for separating a water and water soluble substance permeate from a contaminated water retentate; a permeate outlet (52), operatively connected to said separator means (48) for releasing water and water soluble substances from said system (10); and a return conduit (34) operatively connected between said separation means (48) and said reservoir means (12) for returning contaminated water retentate back to said reservoir means (12); characterized by plunger means (54) operatively connected to said reservoir means (12) and including an inlet chamber (32) for drawing contaminated water therefrom, said plunger means (54) containing said separator means therein for forcing the contaminated water in said inlet chamber (32) through said separator means (48) so that the permeate flows out said permeate outlet (52) and the retentate flows to said return conduit (36).

2. A system as set forth in claim 1 further characterized by including a barrel (28) connected to said reservoir means (12), said barrel (28) including a separator chamber (30) including said separator means (48), said barrel (28) further including said inlet chamber (32), said inlet chamber (32) being disposed adjacent to said separator chamber (30).

3. A system as set forth in claim 2 further characterized by said inlet chamber (32) including a wall (58) disposed thereabout said plunger means (54) further including a piston (60) disposed within said inlet chamber (32) and in sealing engagement with said wall (58) for axial reciprocating movement relative thereto, a rod (62) connected to said piston (60) and extending axially therefrom and being exposed outside of said barrel (28), and a handle member (64) connected to said rod (62) outside of said barrel (28).

4. A system as set forth in claim 3 further characterized by said separator means (48) comprising a cartridge including a plurality of hollow fiber membranes (50) consisting of regenerated cuproammonium cellulose or viscose cellulose fibers, each of said fibers having an outer surface (55) and an inner hollow core (53), said inlet chamber (32) and return conduit (36) being in direct fluid communication with either said outer surface or inner hollow core and said permeate outlet (52) being in fluid communication with, the other of said outer surface (55) or inner hollow core (53).

5. A system as set forth in claim 3 further characterized by said reservoir means including a fluid chamber having a top and bottom surface and a closed wall extending therebetween for containing the contaminated water therein, said outlet conduit extending from said barrel and into said fluid chamber and having an end portion, said system including an inlet conduit having a first end in fluid communication with said inlet chamber and a second end disposed within said fluid chambers and spaced from said end portion of said outlet conduit.

6. A system as set forth in claim 5 further characterized by said end portion of said outlet conduit being disposed proximate to said top surface and said second end of said inlet conduit being disposed proximate to said bottom surface.

7. A system as set forth in claim 5 further characterized by said outlet conduit (36) including first one way valve means (46) for allowing flow in only one direction from said barrel (28) to said reservoir means (12) and said inlet conduit (40) including second one way valve means (44) for allowing flow in only one direction from said reservoir means (12) to said inlet chamber (32).

8. A system as set forth in claim 1 further characterized by said reservoir means (12) including a fill port (26) for allowing filling of said reservoir means (12) with the contaminated water (14).

9. A portable water purification system (10) comprising: separator means (48) for separating a water and water soluble substance permeate from a contaminated water retentate; a permeate outlet (52) operatively connected to said separator means (48) for releasing water and water soluble substances from said system (10); and a return conduit (34) having one end operatively connected to said separation means (48) and a second end adapted to be connected to a reservoir (12) for returning contaminated water retentate back to the reservoir means (12); characterized by plunger means (54) adapted to be operatively connected to the reservoir (12) and including an inlet chamber (32) for drawing contaminated water therefrom, said plunger means (54) containing said separator means therein for forcing the contaminated water in said inlet chamber (32) through said separator means (48) so that the permeate flows out said permeate outlet (52) and the retentate flows to said return conduit (36).

* * * * *